United States Patent
Wang et al.

(10) Patent No.: US 9,298,970 B2
(45) Date of Patent: Mar. 29, 2016

(54) METHOD AND APPARATUS FOR FACILITATING INTERACTION WITH AN OBJECT VIEWABLE VIA A DISPLAY

(71) Applicant: Nokia Technologies Oy, Espoo (FI)

(72) Inventors: Kongqiao Wang, Helsinki (FI); Leo Karkkainen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 101 days.

(21) Appl. No.: 13/686,092

(22) Filed: Nov. 27, 2012

(65) Prior Publication Data
US 2014/0147021 A1    May 29, 2014

(51) Int. Cl.
*G06K 9/00* (2006.01)
*G06F 3/01* (2006.01)

(52) U.S. Cl.
CPC ............ *G06K 9/00228* (2013.01); *G06F 3/011* (2013.01); *G06K 9/00624* (2013.01); *G06K 9/00* (2013.01)

(58) Field of Classification Search
CPC ... G06F 3/0481; G06F 17/5072; G06F 3/011; G06F 3/0416; G06F 3/04815; G06F 3/0488; G06F 3/04842; H04N 5/2621; H04N 5/23293; H04N 1/32101; G02B 2027/0112; G02B 2027/014; G02B 2027/0138; G06K 9/00671; G06K 9/00228; G06K 9/00624; G06K 9/6253; G06K 9/00577; G06K 9/00; G06T 7/0057; G06T 19/20; H04W 88/02
USPC .................. 382/103, 118, 286; 359/407, 630; 345/420, 629, 173, 158, 660, 156, 633
See application file for complete search history.

(56) References Cited

U.S. PATENT DOCUMENTS

| | | | | |
|---|---|---|---|---|
| 5,559,942 | A  * | 9/1996 | Gough et al. | 715/802 |
| 5,844,547 | A  * | 12/1998 | Minakuchi et al. | 345/173 |
| 6,184,859 | B1 * | 2/2001 | Kojima | 345/629 |
| 6,295,069 | B1 | 9/2001 | Shirur | |
| 6,980,363 | B1 * | 12/2005 | Takagi et al. | 359/630 |
| 7,120,279 | B2 * | 10/2006 | Chen et al. | 382/118 |

(Continued)

FOREIGN PATENT DOCUMENTS

| | | |
|---|---|---|
| EP | 1 271 293 A2 | 1/2003 |
| WO | WO-2012/040107 A1 | 3/2012 |

OTHER PUBLICATIONS

Internatinal Search Report and Written Opinion for Application No. PCT/FI2013/051064 dated Feb. 13, 2014.

(Continued)

*Primary Examiner* — Vu Le
*Assistant Examiner* — Aklilu Woldemariam
(74) *Attorney, Agent, or Firm* — Alston & Bird LLP

(57) ABSTRACT

A method, apparatus and computer program product are provided to facilitate interaction with a computing device, such as interaction with an object viewable via a display of a computing device. In the context of a method, an object viewable via a display is identified, such as by facial recognition. The method also includes determining that the object has become aligned with an operation indicator as a result of movement of the display relative to the object. In response to determining that the object is aligned with the operation indicator, the method also performs an operation associated with the operation indicator. In this regard, a method may perform the operation upon at least one aspect associated with the object. Corresponding apparatus and computer program products are also provided.

17 Claims, 6 Drawing Sheets

(56) References Cited

U.S. PATENT DOCUMENTS

| | | | |
|---|---|---|---|
| 7,230,583 B2* | 6/2007 | Tidwell et al. | 345/8 |
| 7,626,578 B2* | 12/2009 | Wilson et al. | 345/175 |
| 7,924,506 B2 | 4/2011 | Rieger | |
| 8,199,974 B1 | 6/2012 | Gomez et al. | |
| 8,223,088 B1 | 7/2012 | Gomez et al. | |
| 8,473,862 B1 | 6/2013 | Davidson | |
| 8,531,539 B2* | 9/2013 | Sasaki | H04N 5/232 348/208.13 |
| 8,564,693 B2* | 10/2013 | Makii | G06T 7/0057 348/239 |
| 2002/0140745 A1 | 10/2002 | Ellenby et al. | |
| 2004/0070675 A1* | 4/2004 | Fredlund et al. | 348/208.1 |
| 2006/0061551 A1* | 3/2006 | Fateh | 345/158 |
| 2006/0204135 A1* | 9/2006 | Funakura | 382/291 |
| 2008/0048044 A1 | 2/2008 | Zhao et al. | |
| 2008/0159591 A1* | 7/2008 | Ruedin | 382/103 |
| 2008/0262910 A1 | 10/2008 | Altberg et al. | |
| 2009/0091553 A1* | 4/2009 | Keam et al. | 345/175 |
| 2010/0103311 A1* | 4/2010 | Makii | 348/369 |
| 2010/0125812 A1* | 5/2010 | Hartman | G02B 27/01 715/848 |
| 2010/0238286 A1* | 9/2010 | Boghossian | G06K 9/00771 348/143 |
| 2011/0034247 A1 | 2/2011 | Masuda et al. | |
| 2011/0078620 A1* | 3/2011 | Chiou | G06K 7/10722 715/781 |
| 2011/0221669 A1 | 9/2011 | Shams et al. | |
| 2011/0254861 A1 | 10/2011 | Emura et al. | |
| 2012/0243739 A1* | 9/2012 | Fukuchi | G06K 9/00671 382/103 |
| 2012/0293548 A1 | 11/2012 | Perez et al. | |
| 2013/0093788 A1* | 4/2013 | Liu | G06F 3/011 345/633 |

OTHER PUBLICATIONS

"*Facial Recognition, Augmented Reality and Gesture Control to Promote 'The Hunger Games*';" Digital AV Magazine; dated Apr. 18, 2012; retrieved on Apr. 5, 2013 from <http://www.digitalavmagazine.com/en/2012/04/18/reconocimiento-facial-realidad-aumentada-y-control-de-gestos-para-promocionar-los-juegos-del-hambre/>.

Hendrickx, G.; "*Augmented Reality Face Recognition for Mobile Devices*;" Katholieke Universiteit Leuven.

Storring, M., et al.; "*Computer Vision-Based Gesture Recognition for an Augmented Reality Interface*;" 4th IASTED International Conference on Visualization, Imaging, and Image Processing; pp. 766-771; dated Sep. 2004.

\* cited by examiner

METHOD AND APPARATUS FOR FACILITATING INTERACTION WITH AN OBJECT VIEWABLE VIA A DISPLAY

TECHNOLOGICAL FIELD

An example embodiment of the present invention relates generally to a method and apparatus for facilitating interaction with a computing device and, more particularly, to a method and apparatus for interacting with an object viewable via a display of the computing device.

BACKGROUND

Users of computing devices interact with those devices on a frequent and repeated basis. Accordingly, a number of different techniques have been developed to facilitate interaction with the computing devices. These techniques may include the receipt of user input via a keypad, via a touchscreen or via audible commands, to name but a few. Although various techniques for facilitating user interaction have been developed, the user experience may be improved by further improvements related to user interaction with computing devices.

By way of example, pass-through displays may permit a user to view one or more objects through the display. Similarly, other types of computing devices may present an image upon the display, such as an image captured by a camera carried by the computing device, with the image including one or more objects. In either instance, a user may wish to interact with an object that is viewable via the display, such as by performing an operation upon the object. The user experience may therefore be improved by correspondingly providing further improvements in regards to the user's interaction with objects viewable via the display of a computing device.

BRIEF SUMMARY

A method, apparatus and computer program product are therefore provided according to an example embodiment of the present invention in order to facilitate interaction with a computing device, such as interaction with an object viewable via a display of a computing device. In this regard, the method, apparatus and computer program product of an example embodiment may permit an operation to be performed upon at least one aspect associated with an object viewable via the display. As such, the user experience with a computing device, such as a pass-through display, may be improved as a result of the interaction provided in accordance with a method, apparatus and computer program product of an example embodiment.

In one embodiment, a method is provided that includes identifying an object viewable via a display. For example, the method of one embodiment may employ facial recognition to identify a person. The method also includes determining, with a processor, that the object has become aligned with an operation indicator as a result of movement of the display relative to the object. In response to determining that the object is aligned with the operation indicator, the method also performs an operation associated with the operation indicator. In this regard, a method may perform the operation upon at least one aspect associated with the object.

The method of one embodiment may also include providing for selection of the object. In this embodiment, the performance of the operation may not only be dependent upon the determination that the object is aligned with the operation indicator, but also upon the selection of the object. In one embodiment, the method also causes the operation indicator to be presented upon the display. In an embodiment in which the display comprises a pass-through display, the method may identify the object by identifying an object viewable through the pass-through display. In another embodiment, the method may receive an image that includes the object and may cause the image to be presented upon the display prior to identifying the object.

In another embodiment, an apparatus is provided that includes at least one processor and at least one memory including computer program code with at least one memory and computer program code configured to, with the processor, cause the apparatus to at least identify an object viewable via a display, such as by employing facial recognition to identify a person. The at least one memory and the computer program code also configured to, with the processor, cause the apparatus to determine that the object has become aligned with an operation indicator as a result of movement of the display relative to the object. The at least one memory and the computer program code are also configured to, with the processor, cause the apparatus of this embodiment to perform an operation associated with the operation indicator in response to determining that the object is aligned with the operation indicator. The at least one memory and the computer program code are also configured to, with the processor, cause the apparatus of this embodiment to perform the operation upon at least one aspect associated with the object.

The at least one memory and the computer program code may be further configured to, with the processor, cause the apparatus of an example embodiment to provide for selection of the object. In this embodiment, the performance of the operation may not only be dependent upon the determination that the object is aligned with the operation indicator, but also upon the selection of the object. In one embodiment, the at least one memory and the computer program code may also be configured to, with the processor, cause the apparatus to cause the operation indicator to be presented upon the display. In an embodiment in which the display includes a pass-through display, the at least one memory and the computer program code may be configured to, with the processor, cause the apparatus to identify an object by identifying an object viewable through the pass-through display. The at least one memory and the computer program code may be further configured to, with the processor, cause the apparatus of another embodiment to receive an image that includes the object and to cause the image to be presented upon the display prior to identifying the object.

In a further embodiment, a computer program product is provided that includes at least one non-transitory computer-readable storage medium having computer-executable program code portions stored therein with the computer-executable program code portions including program code instructions for identifying objects viewable via a display, such as by employing facial recognition to identify a person. The computer-executable program code versions of this embodiment also include program code instructions for determining that the object has become aligned with an operation indicator as a result of movement of the display relative to the object. The computer-executable program code portions of this embodiment also include program code instructions for performing an operation associated with the operation indicator in response to determining that the object is aligned with the operation indicator. In this regard, the program code instructions for performing the operation may include program code instructions for performing the operation based upon at least one aspect associated with the object.

The computer-executable program code portions of one embodiment may also include program code instructions for providing for selection of the object. In this regard, the program code instructions for performing the operation may not only be dependent upon a determination that the object is aligned with the operation indicator, but may also require the object to have been selected prior to performing the operation. In one embodiment, the computer-executable program code portion may also include program code instructions for causing the operation indicator to be presented upon the display. In an embodiment in which the display includes a pass-through display, the program code instructions for identifying an object may include program code instructions for identifying an object viewable through the pass-through display. In another embodiment, the computer-executable program code portions may also include program code instructions for receiving the image that includes the object and causing the image to be presented upon the display prior to identifying the object.

In yet another embodiment, an apparatus is provided that includes means for identifying an object viewable via a display. The apparatus of this embodiment may also include means for determining that the object has become aligned with an operation indicator as a result of movement of the display relative to the object. The apparatus of this embodiment may also include means for performing an operation associated with the operation indicator in response to determining that the object is aligned with the operation indicator. In this regard, the means for performing the operation may be configured to perform the operation upon at least one aspect associated with the object.

BRIEF DESCRIPTION OF THE DRAWINGS

Figure 1:
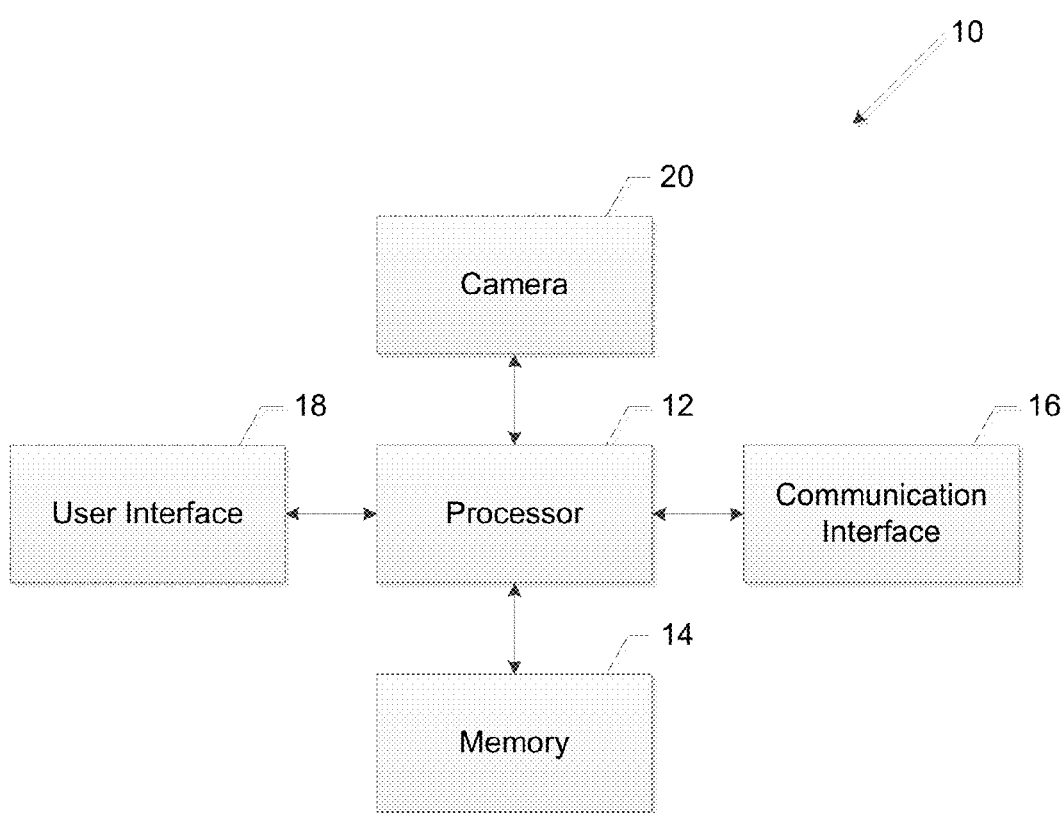
Figure 2:
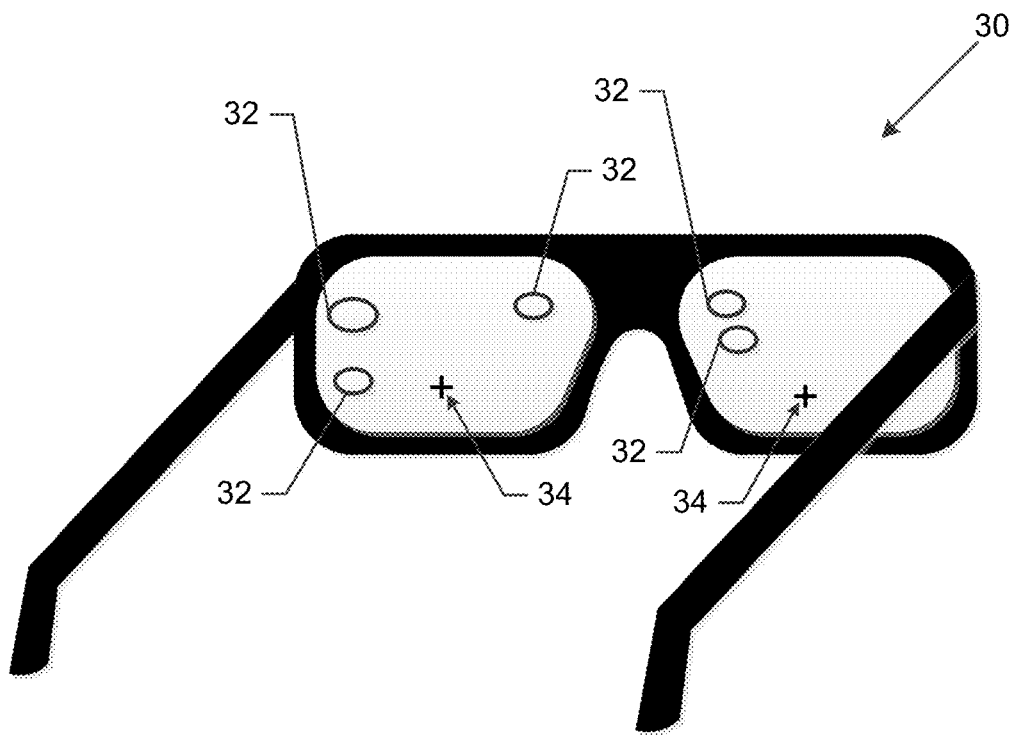
Figure 3:
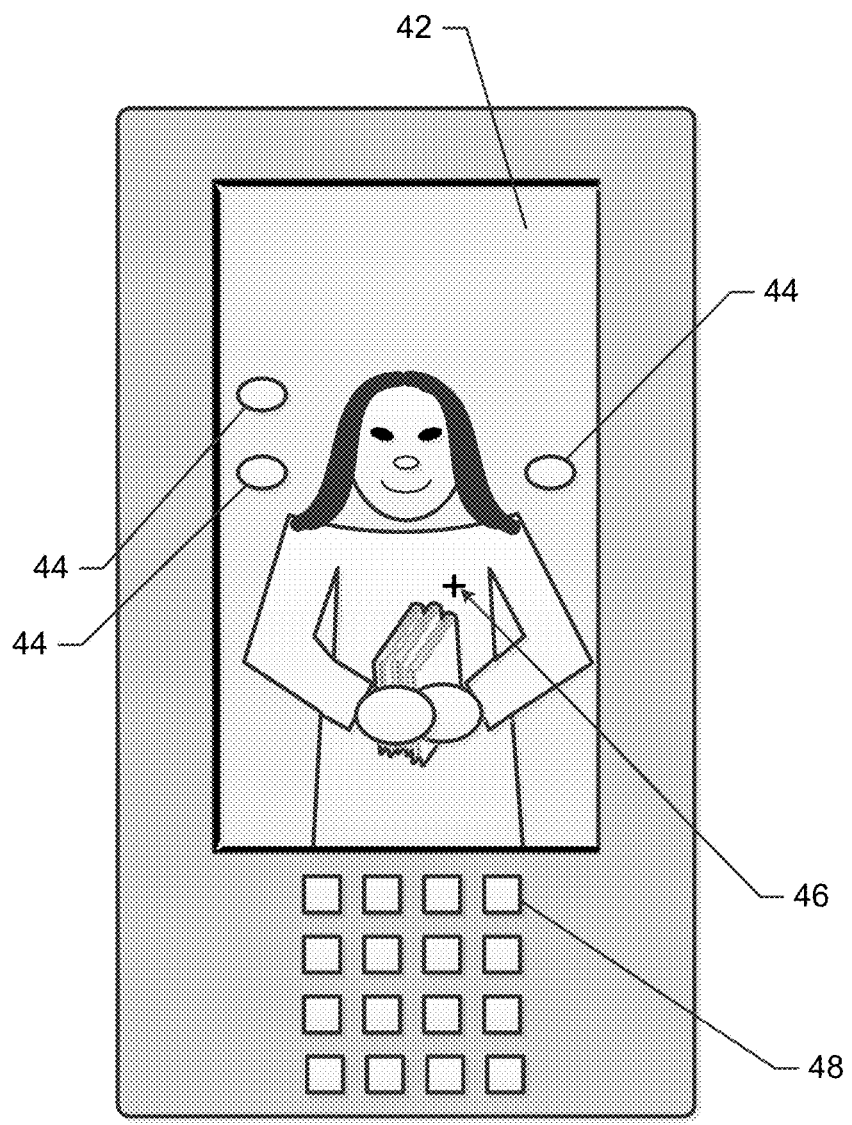
Figure 4:
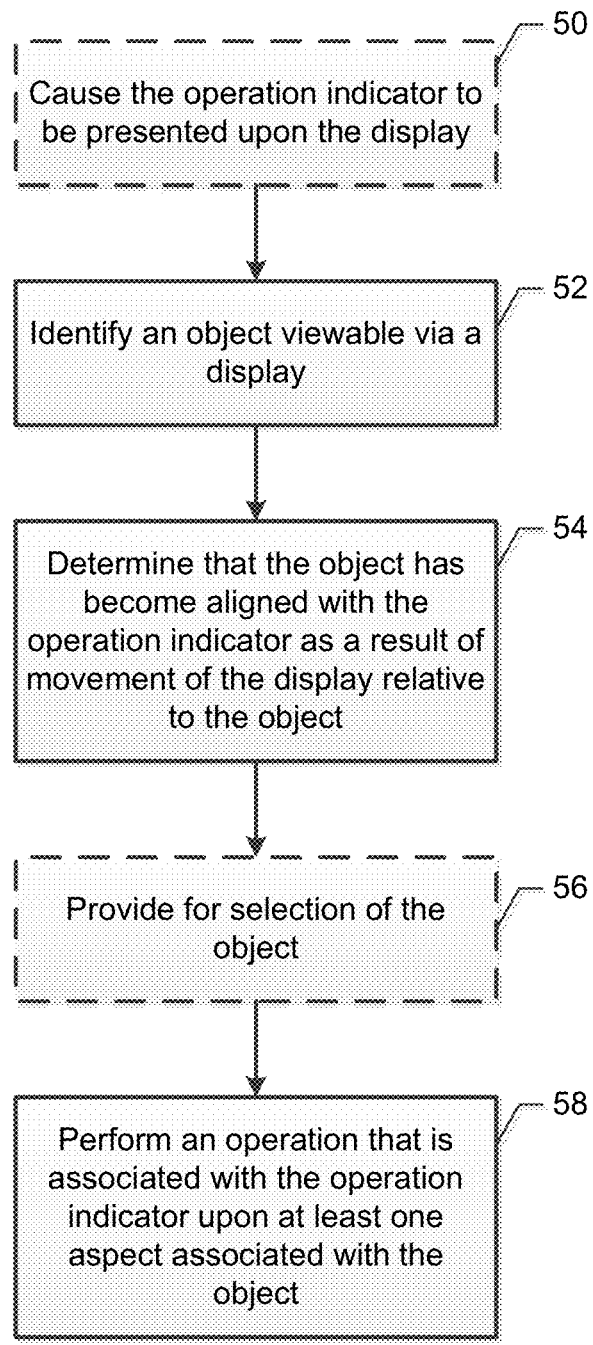
Figure 5:
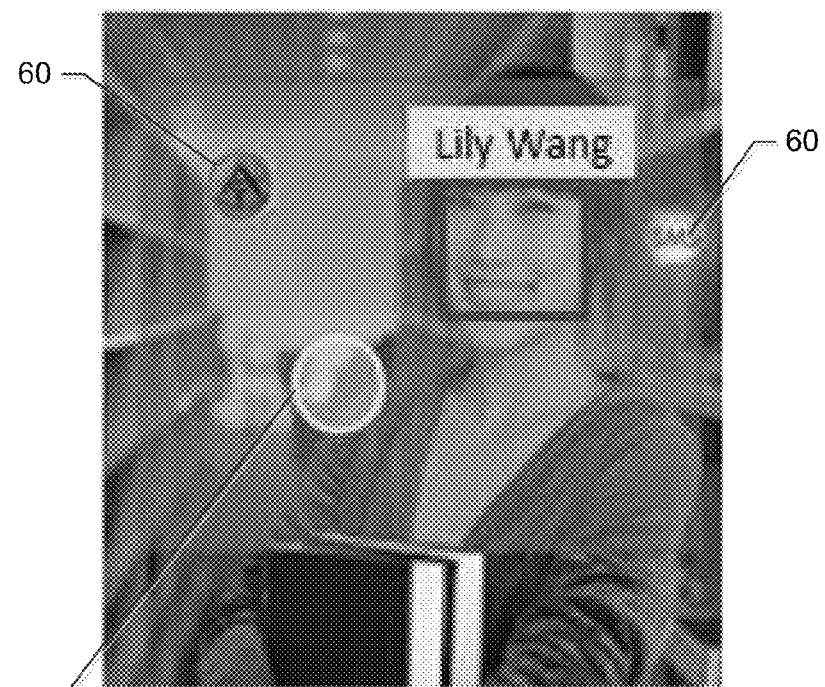
Figure 6:
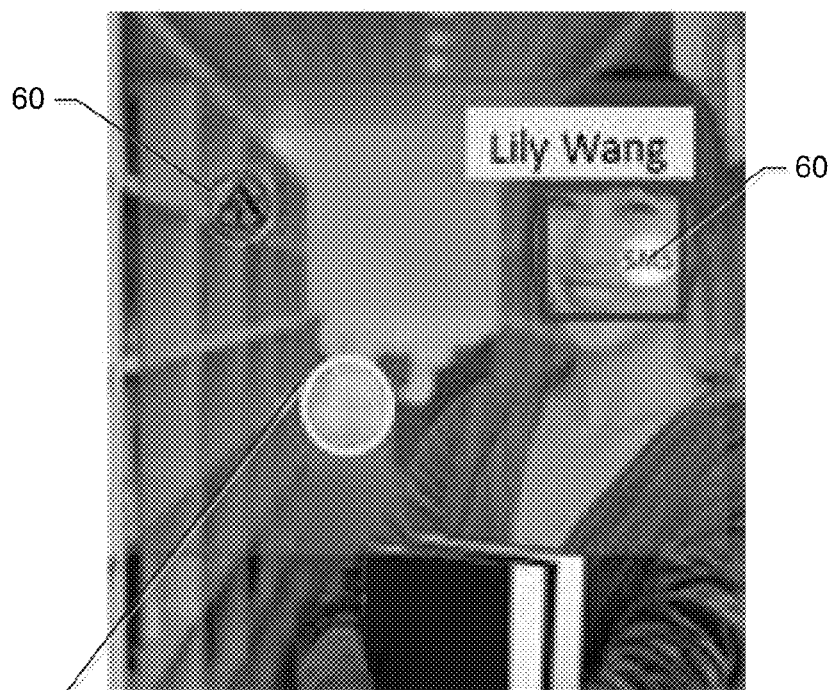
Figure 7:

Having thus described certain example embodiments of the present invention in general terms, reference will hereinafter be made to the accompanying drawings, which are not necessarily drawn to scale, and wherein:

FIG. 1 is block diagram of an apparatus that may be specifically configured in accordance with an example embodiment of the present invention;

FIG. 2 is perspective view of a pass-through display that may be specifically configured in accordance with an example embodiment of the present invention;

FIG. 3 is a plan view of a mobile terminal that may be specifically configured in accordance with an example embodiment to the present invention;

FIG. 4 is a flowchart illustrating operations performed, such as by the apparatus of FIG. 1, in accordance with an example embodiment to the present invention;

FIG. 5 is an image that includes an object, a plurality of operation indicators and a representation of a cursor;

FIG. 6 is the image of FIG. 5 with one of the operation indicators having become aligned with the object as a result of movement of the display relative to the object and in accordance with an example embodiment of the present invention; and FIG. 7 is the image of FIGS. 5 and 6 which depicts the performance of an operation upon at least one aspect associated with the object in response to determining that the object is aligned with the operation indicator in accordance with an example embodiment to the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided according to an example embodiment of the present invention in order to facilitate user interaction with objects viewable via a display. In this regard, the method, apparatus and computer program product of an example embodiment may permit an operation to be performed upon at least one aspect associated with the object. Although the method, apparatus and computer program product may be utilized in conjunction with a variety of computing devices having associated displays upon which an object is viewable, the method, apparatus and computer program product of one example embodiment may facilitate user interaction with an object viewable via a pass-through display such that an operation may be performed upon at least one aspect associated with the object viewable through the pass-through display. The method, apparatus and computer program product of this embodiment may therefore permit the user to interact more readily with objects in their vicinity.

An example embodiment of the invention will now be described with reference to FIG. 1, in which certain elements of an apparatus 10 for facilitating interaction with an object viewable via a display are depicted. The apparatus of FIG. 1 may be employed, for example, in conjunction with, such as by being incorporated into or embodied by, various computing devices, such as a pass-through display or a mobile terminal. However, it should be noted that the apparatus of FIG. 1 may also be employed in connection with a variety of other computing devices and therefore, embodiments of the present invention should not be limited to application with the various examples of the computing devices that are described below.

It should also be noted that while FIG. 1 illustrates one example of a configuration of an apparatus 10 for facilitating interaction with an object viewable via a display, numerous other configurations may also be used to implement embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 1, the apparatus 10 for facilitating interaction with an object viewable via a display may include or otherwise be in communication with a processor 12, a memory device 14, a communication interface 16 and optionally a user interface 18 and a camera 20. In this regard, reference to a camera includes an embodiment that includes a single camera as well as an embodiment that includes a plurality of cameras, such as to facilitate construction of a wide angle image. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The apparatus 10 may be embodied by a computing device, such as a pass-through display or a mobile terminal. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 16 may be any means such as a device or circuitry embodied in either hardware or a combination of hardware and software that is configured to receive and/or transmit data from/to a network and/or any other device or module in communication with the apparatus 10. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, the apparatus 10 may include a user interface 18 that may, in turn, be in communication with the processor 12 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, and/or the like).

In some example embodiments, the apparatus 10 may include an image capturing element, such as a camera 20, video and/or audio module, in communication with the processor 12. The image capturing element may be any means for capturing an image, video and/or audio for storage, display or transmission. As used herein, an image includes a still image as well as an image from a video recording. For example, in an example embodiment in which the image capturing element is a camera, the camera may include a digital camera capable of forming a digital image file from a captured image. As such, the camera may include all hardware (for example, a lens or other optical component(s), image sensor, image signal processor, and/or the like) and software necessary for creating a digital image file from a captured image. Alternatively, the camera may include only the hardware needed to view an image, while the memory device 14 of the apparatus stores instructions for execution by the processor in the form of software necessary to create a digital image file from a captured image. In an example embodiment, the camera may further include a processing element such as a co-processor which assists the processor in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

The apparatus 10 of FIG. 1 may be embodied by or otherwise associated with a variety of different computing devices, each of which has an associated display. For example, the apparatus may be embodied by or associated with a pass-through display. A pass-through display may be embodied in various manners. For example, the pass-through display may be a near-eye display, such as a head worn display, through which the user may optically view a scene external to the near-eye display. By way of example, a near-eye display of one embodiment is shown in FIG. 2 in the form of a pair of eyeglasses 30. The eyeglasses may be worn by a user such that the user may view a scene, e.g., a field of view, through the lenses of the eyeglasses. However, the eyeglasses of this embodiment may also be configured to present a visual representation of information upon the lenses so as to augment or supplement the user's view of the scene through the lenses of the eyeglasses. The information presented by the eyeglasses may augment the objects in the scene viewed through the eyeglasses, such as by identifying or otherwise providing more information regarding one or more of the objects viewed through the eyeglasses. Alternatively, the information presented by the eyeglasses may be unrelated to the objects in the scene viewed through the eyeglasses, but may otherwise provide information that may be of interest to the user. Regardless of the type of information presented by the eyeglasses, a pass-through display as exemplified by the eyeglasses of FIG. 2 may support augmented reality and other applications. As another example, the pass-through display may be embodied by a windshield, a visor, a helmet or other type of display through which a user optically views an image or a scene external to the display. While examples of a pass-through display have been provided, a pass-through display may be embodied in a number of different manners with a variety of form factors, each of which may permit a user to optically see through the display so as to view the user's surroundings and each of which may benefit from the method, apparatus and computer program product of an example embodiment of the present invention as described below.

By way of another example, the apparatus 10 of FIG. 1 may be embodied by or associated with a mobile terminal 40. The mobile terminal may be embodied by any of a variety of computing devices including, but not limited to, a portable digital assistant (PDA), mobile telephone, smartphone, pager, mobile television, gaming device, laptop computer, camera, tablet computer, touch surface, video recorder, audio/video player, radio, electronic book, positioning device (e.g., global positioning system (GPS) device), or any combination of the aforementioned, and other types of voice and text communications systems. Regardless of the type of computing device, the mobile terminal may include a display 42 and a user interface. In the illustrated embodiment, the user interface includes such as one or more keys 48 for receiving user input. However, the mobile terminal need not include the keys and may, instead, include another type of user interface, such as a touch screen display. The apparatus embodied by or associated with the mobile terminal, such as shown in FIG. 3, may include a camera 20 so as to capture an image, such as an image of the surroundings proximate the mobile terminal. The image may, in turn, be presented upon the display, such as the image of a woman holding a pair of books that is presented upon the display of the embodiment of the mobile terminal in FIG. 3.

In one embodiment, the apparatus 10 may be embodied by the computing device, such as the pass-through display or the mobile terminal 30. Alternatively, the apparatus may be embodied by a computing device that is remote from the display upon which the object is viewable, but that is in communication therewith, such as via wireless communication, e.g., via Bluetooth communication, Wi-Fi or another wireless network, or via wired communication, utilizing the communication interface 16.

Regardless of the embodiment, an object is viewable via a display of a computing device, such as the computing device that embodies or is otherwise associated with the apparatus 10 of FIG. 1. With respect to a pass-through display, an object may be viewable through the display, such as an object proximate the user at which the user is looking. Alternatively, in an embodiment in which a mobile terminal 30 includes or is otherwise associated with a camera that captures an image, the image captured by the camera, such as an image of the user's surroundings, may be presented upon the display such that a user may view an object within the image presented upon the display. One example of such an image is presented in FIG. 3. As such, an object viewed by a user may be viewable through the display or upon the display.

The method, apparatus 10 and computer program product of an example embodiment will now be described in conjunction with the operations illustrated in FIG. 4. In this regard, the apparatus 10 may include means, such as the processor 12, the user interface 18 or the like, for identifying an object viewable via the display. See block 52 of FIG. 4. The object may be identified in various manners. In one embodiment in which the object is a person, the apparatus, such as the processor, may be configured to employ facial recognition in order to identify the person. In this regard, FIG. 5 depicts an image that is viewable via a display, such as an image viewable through a pass-through display or an image presented upon the display of a mobile terminal. In the embodiment of FIG. 5, the object is a person, who has been recognized by facial recognition as indicated by the box that bounds the person's face.

Alternatively, in an instance in which the object is a building, landmark or other structure, the apparatus 10, such as the processor 12, may be configured to identify the object based upon the geographic location of the object, such as may be estimated by the geographic location of the computing device as provided, for example, by a positioning sensor, and with reference to a database, such as may be maintained by memory 14, which identifies various buildings, landmarks or other structures by geographic location. In this embodiment, the positioning sensor may include, for example, a global positioning system (GPS) sensor, an assisted global positioning system (A-GPS) sensor, a Bluetooth (BT)-GPS mouse, other GPS or positioning receivers or the like. The positioning sensor may be capable of determining a location of the computing device that embodies the apparatus, such as, for example, longitudinal and latitudinal directions of the computing device, or a position relative to a reference point such as a destination or start point.

Alternatively, the apparatus 10, such as the processor 12, may be configured to identify a building, landmark or other structure by comparing the appearance of the building, landmark or other structure that is viewable via the display with a database, such as may be maintained by memory 14, of images of various buildings, landmarks and other structures in order to identify a building, landmark or other structure that has a matching appearance. The apparatus, such as the processor, the user interface 18 or the like, may be configured to identify the object viewable via the display in other manners. For example, the apparatus, such as the processor, the user interface or the like, may be configured to identify the object by permitting the user to provide an identification of the object, such as by entering the name of the object or other indicia identifying the object.

Regardless of the manner in which the object is identified, the apparatus 10, such as the processor 12, the user interface 18 or the like, may cause a representation of the identification of the object, such as the name of the object or other indicia identifying the object, to be presented upon the display in proximity to the object. For example, the person that was identified in the embodiment of FIG. 5 is identified as Lily Wang.

As shown in FIGS. 2, 3 and 5, the apparatus 10 of one embodiment may include means, such as the processor 12, the user interface 18 or the like, for causing one or more operation indicators to be presented upon the display. See block 50 of FIG. 4. In this regard, the circles 32, 44, 60 that are presented upon the displays of FIGS. 2, 3 and 5, respectively, are representative of operation indicators. Operation indicators may take various forms, such as icons, alpha-numeric designations or the like. Regardless of the manner in which an operation indicator is presented, an operation indicator is representative of an operation that may be performed upon selection of the operation indicator. By way of example, a short message service (SMS) operation indicator, as shown in FIG. 5, may cause an SMS message to be generated upon selection of the SMS operation indicator. As another example, a Facebook operation indicator may cause a Facebook post to be generated upon actuation of the Facebook operation indicator. As a further example, a camera operation indicator may cause the image viewable via the display to be captured upon actuation of the camera operation indicator. Additionally, a gallery operation indicator may cause all relevant pictures and/or videos that include a particular person to be listed upon actuation of the gallery operation indicator. An outlook operation indicator may cause an electronic mail message to be generated upon selection of the outlook operation indicator and, in some instances may also cause one or more history dialogues with a particular person to be shown. Further, a social networking operation indicator may cause a listing of the common friends between the user and a particular person to be shown upon selection of the social networking operation indicator. While certain examples of an operation indicator are provided above, there may be many other types of operation indicators with the foregoing provided by way of example, but not of limitation.

As shown in FIGS. 3 and 5, the operation indicators 44, 60 may be offset from the object that is viewable via the display. In this regard, the object indicators may not be aligned with or overlap the object, but, instead, may be spaced apart from the object. However, the apparatus of one embodiment includes means, such as the processor 12 or the like, for thereafter determining that the object has become aligned with the operation indicator. See block 54 of FIG. 4. In this regard, the object is aligned with the operation indicator in an instance in which the operation indicator overlies, either fully or at least partially, the object or a designated region of the object. In this regard, FIG. 5 depicts a scene or an image that is viewable via the display, e.g., a scene viewable through a pass-through display or an image presented upon the display of a mobile terminal. As described above, the object has been identified, such as by facial recognition, as Lily Wang. In addition, the two operation indicators 60 are offset from and therefore are not aligned with the object. In FIG. 6, however, the SMS operation indicator is in alignment with the object and, more particularly, with a designated portion of the object, that is, the face of Lily Wang that was the subject of facial recognition as designated by the box bounding her face. Thus, in an instance in which a portion of the object viewable via the display is designated, such as the face of a person that was identified via facial recognition as designated by a bounding box, the alignment of an operation indicator with the object may be accomplished by aligning the operation indicator with the designated portion of the object. Alternatively, in an instance in which no portion of the object viewable via the display is specifically designated, the alignment of the operation indicator with the object may be accomplished by aligning the operation indicator with any portion of the object.

In accordance with an example embodiment to the present invention, the object may be aligned with the operation indicator as a result of movement of the display relative to the object as opposed to, for example, movement of the operation indicator, such as the result of a drag operation, relative to the display. For example, in an instance in which the display is a pass-through display, the user wearing the pass-through display, such as the user wearing the eyeglasses 30 of FIG. 2, may move their head in such a manner that the object viewable via the display becomes aligned with the operation indicator 32. Alternatively, in an instance in which the display is the display of a mobile terminal 40 as shown in FIG. 3, the mobile terminal may be moved or repositioned such that the image captured by the camera 20 following the repositioning or the mobile terminal includes the object in a position that is now aligned with the operation indicator. As will be noted by the foregoing examples, the alignment of the object with respect to the operation indicator is brought about as a result of movement of the display, such as the eyeglasses of FIG. 2 or the mobile terminal of FIG. 3, relative to the object and the relative position of the operation indicators upon the display remain the same, that is, the relative position of the operation indicators upon the display are independent of movement of the display relative to the object. As such, the relative position of object with respect with respect to the display is changed as a result of the relative movement of the display with respect to the object as exemplified by a comparison of FIGS. 5 and 6, without repositioning the operation indicators upon the display.

The apparatus 10 may also include means, such as the processor 12, the user interface 18 or the like, for performing an operation associated with the operation indicator in response to determining that the object is aligned with the operation indicator. See block 58 of FIG. 4. In this regard, the apparatus, such as the processor, may be configured to perform the operation upon at least one aspect associated with the object. The operations that are performed in response to determining that the object is aligned with the operation indicator depends upon the operation indicator with which the object has become aligned. In regards to the SMS operation indicator, a SMS message may be generated as shown in FIG. 7. Alternatively, the operation performed in response to the object being aligned with a Facebook operation indicator may be the generation of a Facebook post. As another example, in an instance in which the object is aligned with the gallery operation indicator, all the pictures and/or videos including the object may be listed on the display so that the user can easily browse them. Additionally, upon an object becoming aligned with an outlook operation indicator, an electronic mail message may be generated and, in some instances one or more history dialogues may be shown. Furthermore, in an instance in which the object becomes aligned with the social networking operation indicator, a listing of friends may be presented. As such, various operations may be performed depending upon the operation associated with or represented by the operation indicator with which the object becomes aligned.

Regardless of the operation that is associated with operation indicator with which the object becomes aligned, the operation that is performed is performed upon at least one aspect associated with the object, such as based upon the name of the object, an appearance of the object, contacts associated with the object, metadata associated with the object or other aspects associated with the object. With respect to the SMS and Facebook operation indicators, a message or a post may be generated that is directed to or otherwise associated with the person whose image has become aligned with the operation indicator. By way of other examples, in an instance in which an image of a person is aligned with the gallery operation indicator, all the pictures and/or videos including the person may be listed to facilitate browsing. Additionally, upon an image of a person becoming aligned with an outlook operation indicator, an electronic mail message may be generated that is addressed to the person and, optionally, one or more history dialogues of message exchanges between the person and the user may be shown. Furthermore, in an instance in which an image of a person becomes aligned with the social networking operation indicator, a listing of friends that are common to both the person and the user may be presented. Although several examples are provided above, other types of operations may be performed based upon at least one aspect associated with the object in other embodiments.

In one embodiment, the performance of an operation associated with the operation indicator is not only based upon a determination that the object is aligned with the operation indicator, but also upon a selection of the object so as to avoid inadvertently performing operations as the computing device is repositioned and the object viewable via the display becomes aligned with various operation indicators. As such, the apparatus 10 may include means, such as the processor 12, the user interface 18 or the like, for providing for selection of the object. See block 56 of FIG. 4. The object may be selected in various manners. As shown in FIGS. 2 and 3, a cursor 34, 46 may be caused to be presented upon the display. As such, the cursor may be positioned upon the object and then selected by the user in order to correspondingly select the object. The cursor of this embodiment may be repositioned in various manners including by dragging and dropping the cursor via input provided via a touch screen display in the embodiment of FIG. 3 or via gestures, such as hand gestures that are captured by a camera 20 and interpreted by the processor 12 in conjunction with a pass-through display of the type shown in FIG. 2. However, the object may be selected in still other manners including, for example, by audible command, such as by saying the name of the person who has been identified as the object through facial recognition. In this embodiment, only once the object has been selected and a determination has been made that the object is aligned with the operation indicator, the apparatus, such as the processor, may cause the operation to be performed upon at least one aspect associated with the object.

The method, apparatus 10 and computer program product of an example embodiment of the present invention therefore facilitate the interaction by a user with an object that is viewable via a display, such as viewable through a pass-through display or viewable within an image presented upon a display of a mobile terminal 30. As such, a user may cause an operation to be performed that is based upon at least one aspect associated with the object. The method, apparatus and computer program product of an example embodiment may therefore provide an intuitive mechanism for facilitating user interaction with an object viewable via a display.

As described above, FIG. 4 illustrates a flowchart of an apparatus 10, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by a processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the blocks having a dashed outline in FIG. 4. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for identifying an object viewable via a display of a computing device, the method comprising:
    identifying the object viewable via the display, wherein identification of the object viewable via the display is performed by a processor;
    causing an operation indicator to be presented upon the display concurrent with the object, wherein the operation indicator is associated with an operation that may be performed upon at least one aspect associated with the object;
    determining, with the processor, that the object has become aligned with the operation indicator as presented upon the display as a result of movement of the display relative to the object, wherein a relative position of the operation indicator upon the display is independent of the movement of the display relative to the object; and
    in response to determining that the object is aligned with the operation indicator, performing the operation associated with the operation indicator, wherein performing the operation comprises performing the operation upon at least one aspect associated with the object.

2. A method according to claim 1 further comprising providing for selection of the object.

3. A method according to claim 2 wherein performing the operation comprises performing the operation only in an instance in which the object has been selected.

4. A method according to claim 1 wherein identifying an object comprises employing facial recognition to identify a person.

5. A method according to claim 1 wherein the display comprises a pass-through display, and wherein identifying an object comprises identifying an object viewable through the pass-through display.

6. A method according to claim 1 further comprising:
    receiving an image that includes the object; and
    causing the image to be presented upon the display prior to identifying the object.

7. An apparatus for identifying an object viewable via a display of a computing device, the apparatus comprising at least one processor and at least one memory including computer program code, the at least one memory and the computer program code configured to, with the processor, cause the apparatus to at least:
    identify the object viewable via the display, wherein identification of the object viewable via the display is performed by the apparatus including the at least one processor;
    causing an operation indicator to be presented upon the display concurrent with the object, wherein the operation indicator is associated with an operation that may be performed upon at least one aspect associated with the object;
    determine that the object has become aligned with the operation indicator as presented upon the display as a result of movement of the display relative to the object, wherein a relative position of the operation indicator upon the display is independent of the movement of the display relative to the object; and
    in response to determining that the object is aligned with the operation indicator, perform the operation associated with the operation indicator, wherein the at least one memory and the computer program code are configured to, with the processor, cause the apparatus to perform the operation by performing the operation upon at least one aspect associated with the object.

8. An apparatus according to claim 7 wherein the at least one memory and the computer program code are further configured to, with the processor, cause the apparatus to provide for selection of the object.

9. An apparatus according to claim 8 wherein the at least one memory and the computer program code are configured to, with the processor, cause the apparatus to perform the operation by performing the operation only in an instance in which the object has been selected.

10. An apparatus according to claim 7 wherein the at least one memory and the computer program code are configured to, with the processor, cause the apparatus to identify an object by employing facial recognition to identify a person.

11. An apparatus according to claim 7 wherein the display comprises a pass-through display, and wherein the at least one memory and the computer program code are configured to, with the processor, cause the apparatus to identify an object by identifying an object viewable through the pass-through display.

12. An apparatus according to claim 7 wherein the at least one memory and the computer program code are further configured to, with the processor, cause the apparatus to:
    receive an image that includes the object; and
    cause the image to be presented upon the display prior to identifying the object.

13. A computer program product for identifying an object viewable via a display of a computing device, the computer program product comprising at least one non-transitory computer-readable storage medium having computer-executable program code portions stored therein, the computer-executable program code portions comprising program code instructions for:
    identifying the object viewable via the display, wherein identification of the object viewable via the display is performed by the computing device during execution of the computer-executable program code portions;
    causing an operation indicator to be presented upon the display concurrent with the object, wherein the operation indicator is associated with an operation that may be performed upon at least one aspect associated with the object;

determining that the object has become aligned with the operation indicator as presented upon the display as a result of movement of the display relative to the object, wherein a relative position of the operation indicator upon the display is independent of the movement of the display relative to the object; and in response to determining that the object is aligned with the operation indicator, performing the operation associated with the operation indicator, wherein performing the operation comprises performing the operation upon at least one aspect associated with the object.

14. A computer program product according to claim 13 wherein the computer-executable program code portions further comprise program code instructions for providing for selection of the object, and wherein the program code instructions for performing the operation comprise program code instructions for performing the operation only in an instance in which the object has been selected.

15. A computer program product according to claim 13 wherein the program code instructions for identifying an object comprise program code instructions for employing facial recognition to identify a person.

16. A computer program product according to claim 13 wherein the display comprises a pass-through display, and wherein the program code instructions for identifying an object comprise program code instructions for identifying an object viewable through the pass-through display.

17. A computer program product according to claim 13 wherein the computer-executable program code portions further comprise program code instructions for:

receiving an image that includes the object; and causing the image to be presented upon the display prior to identifying the object.

* * * * *